United States Patent
Komori

(10) Patent No.: US 10,530,010 B2
(45) Date of Patent: Jan. 7, 2020

(54) FLUORIDE SHUTTLE SECONDARY BATTERY

(71) Applicant: Panasonic Corporation, Osaka (JP)

(72) Inventor: Tomoyuki Komori, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/006,393

(22) Filed: Jun. 12, 2018

(65) Prior Publication Data

US 2019/0006708 A1 Jan. 3, 2019

(30) Foreign Application Priority Data

Jul. 3, 2017 (JP) .................................. 2017-130328

(51) Int. Cl.
*H01M 4/02* (2006.01)
*H01M 10/0562* (2010.01)
*H01M 10/0585* (2010.01)

(52) U.S. Cl.
CPC ... *H01M 10/0562* (2013.01); *H01M 10/0585* (2013.01); *H01M 2300/008* (2013.01)

(58) Field of Classification Search
CPC ..................................................... H01M 4/02
See application file for complete search history.

(56) References Cited

U.S. PATENT DOCUMENTS

| 4,931,172 A | 6/1990 | Kobos et al. |
| 4,948,680 A | 8/1990 | Madou et al. |

FOREIGN PATENT DOCUMENTS

| JP | 2-098659 | 4/1990 |
| JP | 2-504445 | 12/1990 |

OTHER PUBLICATIONS

Zhang ("Development of All Solid State Fluoride Ion Batteries Based on Thin Film Electrolytes" Doctoral Dissertation for Ulm University, (Oct. 2016)).*
Sorokin ("Anionic conductivity and thermal stability of single crystals of solid solutions based on strontium fluoride" Solid State Ionics 104 (Mar. 1997) 325-333).*
The Extended European Search Report dated Oct. 15, 2018 for the related European Patent Application No. 18180675.3.
Gschwind F. et al: "Fluoride ion batteries: Theoretical performance, safety, toxicity, and a combinatorial screening of new electrodes", Journal of Fluorine Chemistry, Elsevier, NL, vol. 182, Jan. 2, 2016 (Jan. 2, 2016), pp. 76-90, XP029409624.
Sorokin N. I. et al: "Superionic conductivity of the heterovalent solid solutions R1-xMxF3-x (R=REE, M=Ca, Ba) with tysonite-type structure", Physics of the Solid State, Nauka/Interperiodica, MO, vol. 41, No. 4, Apr. 1, 1999 (Apr. 1, 1999), pp. 573-575, XP019309517.

(Continued)

*Primary Examiner* — Jacob B Marks
(74) *Attorney, Agent, or Firm* — McDermott Will & Emery LLP

(57) ABSTRACT

A fluoride shuttle secondary battery includes a positive electrode layer, a negative electrode layer, and an electrolyte layer. The electrolyte layer is located between the positive electrode layer and the negative electrode layer. At least one layer selected from the group consisting of the positive electrode layer, the negative electrode layer, and the electrolyte layer includes lanthanum fluoride and strontium fluoride.

6 Claims, 1 Drawing Sheet

(56) References Cited

OTHER PUBLICATIONS

B. P. Sobolev et al: "Nonstoichiometry in Inorganic Fluorides: 2. Ionic Conductivity of Nonstoichiometric $M_{1-x}R_xF_{2+x}$ and $R_{1-y}M_yF_{3-y}$ Crystals (M=Ca, Sr, Ba; R are Rare Earth Elements)", Crystallography Reports, vol. 59, No. 6, Nov. 13, 2014 (Nov. 13, 2014), pp. 891-915, XP055509174.

\* cited by examiner

FLUORIDE SHUTTLE SECONDARY BATTERY

BACKGROUND

1. Technical Field

The present disclosure relates to a fluoride shuttle secondary battery.

2. Description of the Related Art

Shuttlecock batteries are one type of secondary batteries. In a shuttlecock battery, ions move between a positive electrode and a negative electrode through an electrolyte to perform charge and discharge. Lithium ion secondary batteries using lithium ions as the moving ions are widely used as shuttlecock batteries. In recent years, fluoride shuttle secondary batteries using fluoride ions instead of lithium ions have been reported.

Japanese Translation of PCT International Application Publication No. 2-504445 discloses an $O^{2-}$ (oxygen ion) conductive material to be used as an electrolyte of a fuel battery. The material is represented by a formula $A_{1-x}B_xZ$, where A represents La, Ce, Nd, Pr, Sc, or a mixture thereof; B represents Sr, Ca, Ba, or Mg; Z represents $F_{3-x}$ or $O_cF_d$; and x is about 0 to 0.9999. c, d, and x satisfy an expression $2c+d=3-x$, where c is 0.0001 to 1.5; and d is 0.0001 to 3.

SUMMARY

One non-limiting and exemplary embodiment provides a fluoride shuttle secondary battery including a novel fluoride ion conductive material.

In one general aspect, the techniques disclosed here feature a fluoride shuttle secondary battery comprising a positive electrode layer, a negative electrode layer, and an electrolyte layer. The electrolyte layer is located between the positive electrode layer and the negative electrode layer. At least one layer selected from the group consisting of the positive electrode layer, the negative electrode layer, and the electrolyte layer includes a fluoride ion conductive material containing lanthanum fluoride and strontium fluoride.

The fluoride shuttle secondary battery according to an embodiment of the present disclosure includes a novel fluoride ion conductive material.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
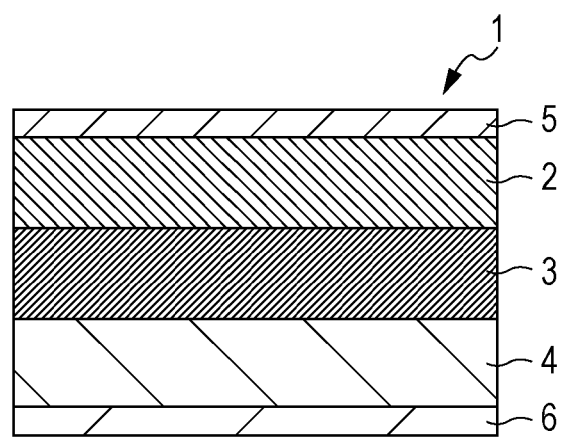
FIG. 1 is a cross-sectional view schematically illustrating a fluoride shuttle secondary battery of an embodiment of the present disclosure.

Underlying Knowledge Forming Basis of an Aspect of the Present Disclosure

A fluoride shuttle secondary battery can have effects as a shuttlecock secondary battery. The effects are, for example, high stability, a high energy density, and a high output density. However, the fluoride shuttle secondary battery is still in the process of research and development. If an electrolyte material showing a high fluoride ion conductivity can be found out, the performance of the fluoride shuttle secondary battery can be improved. The present inventor has found a material that can show a high fluoride ion conductivity. According to the present disclosure, for example, a fluoride shuttle secondary battery having high performance can be achieved.

Aspects of the Disclosure

The fluoride ion conductive material according to a first aspect of the present disclosure contains lanthanum fluoride and strontium fluoride. The fluoride ion conductive material is a material having a fluoride ion conductivity.

In a second aspect of the present disclosure, for example, the fluoride ion conductive material according to the first aspect has a composition represented by a formula $La_{1-x}Sr_xF_{3-x}$, where x satisfies $0.05 \leq x \leq 0.4$. A fluoride ion conductive material having this composition shows a higher fluoride ion conductivity.

The fluoride shuttle secondary battery according to a third aspect of the present disclosure includes a positive electrode layer, a negative electrode layer, and an electrolyte layer. The electrolyte layer is located between the positive electrode layer and the negative electrode layer. At least one layer selected from the group consisting of the positive electrode layer, the negative electrode layer, and the electrolyte layer includes the fluoride ion conductive material of the first or second aspect.

In the fluoride shuttle secondary battery according to a fourth aspect of the present disclosure, for example, the electrolyte layer and/or the negative electrode layer of the fluoride shuttle secondary battery according to the third aspect includes the fluoride ion conductive material.

In the fluoride shuttle secondary battery according to a fifth aspect of the present disclosure, for example, the electrolyte layer of the fluoride shuttle secondary battery according to the third aspect includes the fluoride ion conductive material.

In the fluoride shuttle secondary battery according to a sixth aspect of the present disclosure, for example, the positive electrode layer of the fluoride shuttle secondary battery according to any one of the third to fifth aspects includes a positive electrode active material, and the positive electrode active material includes at least one element selected from the group consisting of Co, Cu, Bi, Sn, Pb, Fe, Zn, Ga, and C.

In the fluoride shuttle secondary battery according to a seventh aspect of the present disclosure, for example, the negative electrode layer of the fluoride shuttle secondary battery according to any one of the third to sixth aspects includes a negative electrode active material, and the negative electrode active material includes at least one element selected from the group consisting of Ti, Zr, Al, Sc, Rb, Ge, Cs, Mg, K, Na, La, Ca, Ba, and Sr.

Embodiments of the present disclosure will now be described with reference to the drawings. The embodiments described below are all inclusive or specific examples. Numerical values, shapes, materials, components, arrangement positions and connection configurations of the components, process conditions, steps, the order of the steps, etc. shown in the following embodiments are merely examples and are not intended to limit the present disclosure. Among the components in the following embodiments, components not described in an independent claim showing the broadest concept are described as optional components. Each figure is a schematic view and is not necessarily strictly illustrated.

Fluoride Ion Conductive Material

The fluoride ion conductive material of the present disclosure contains lanthanum fluoride and strontium fluoride. The material may have any composition. The molar ratio between lanthanum (La) and strontium (Sr), La:Sr, in the material is, for example, 95:5 to 10:90. The molar ratio, La:Sr, can be 95:5 to 20:80 or can be 95:5 to 60:40. The molar ratio between lanthanum fluoride and strontium fluoride, lanthanum fluoride:strontium fluoride, in the material is, for example, 95:5 to 10:90. The molar ratio, lanthanum fluoride:strontium fluoride, can be 95:5 to 20:80 or can be 95:5 to 60:40. In the material of the present disclosure, a part of fluorine may be deficient.

The fluoride ion conductive material of the present disclosure can have a composition represented by a formula $La_{1-x}Sr_xF_{3-x}$, where x satisfies $0.05 \leq x \leq 0.4$ and can satisfy $0.1 \leq x \leq 0.2$. An ion conductive material having such a composition can show a higher fluoride ion conductivity.

The fluoride ion conductive material of the present disclosure may have any crystal condition and can be in a single crystal, polycrystal, or amorphous state or a mixture thereof.

The fluoride ion conductive material of the present disclosure may have any shape, such as particles, a film, a sheet, a disk, a bulk, or a pressurized powder body. The material can have, for example, a shape that can be accommodated in the housing of a fluoride shuttle secondary battery described below. The material can have, for example, a shape that can be stacked with the positive electrode layer and the negative electrode layer of a fluoride shuttle secondary battery described below. The ion conductive material of the present disclosure can be a solid fluoride ion conductive material.

The fluoride ion conductive material of the present disclosure can have a fluoride ion conductance of, for example, $2.0 \times 10^{-7}$ (S/cm) or more, $1.0 \times 10^{-6}$ (S/cm) or more, $1.0 \times 10^{-5}$ (S/cm) or more, $1.0 \times 10^{-4}$ (S/cm) or more, $2.0 \times 10^{-4}$ (S/cm) or more, $4.0 \times 10^{-4}$ (S/cm) or more, $1.0 \times 10^{-3}$ (S/cm) or more, or $3.0 \times 10^{-3}$ (S/cm) or more at 140° C. The fluoride ion conductivity can be evaluated by, for example, a complex impedance method by pressing particles of the material into a disk and connecting both main surfaces of the disk maintained at 140° C. to an impedance analyzer. The fluoride ion conductive material of the present disclosure can show a high fluoride ion conductivity at a relatively low temperature of 200° C. or less, such as 140° C.

The application of the fluoride ion conductive material of the present disclosure is not limited. The application is, for example, a solid fluoride ion conductive material. A more specific example of the application is a solid electrolyte that conducts fluoride ions. The ion conductive material of the present disclosure can be used, for example, in a fluoride shuttle secondary battery. The fluoride shuttle secondary battery is a rechargeable secondary battery. In the fluoride shuttle secondary battery, fluoride ions move between the positive electrode and the negative electrode through the electrolyte to perform charge and discharge. The fluoride ion conductive material of the present disclosure can be used as the electrolyte that is included in at least one layer selected from the group consisting of the positive electrode layer, the negative electrode layer, and the electrolyte layer of the battery. More specifically, the fluoride ion conductive material of the present disclosure can be used as the electrolyte that is included in the electrolyte layer, particularly, the solid electrolyte layer, of the battery. The fluoride ion conductive material of the present disclosure can also be used as the negative electrode active material included in the negative electrode layer of the fluoride shuttle secondary battery depending on the combination with the positive electrode active material included in the positive electrode layer.

A fluoride shuttle secondary battery including the fluoride ion conductive material of the present disclosure can be an all-solid secondary battery. The all-solid secondary battery has high safety and can have a high energy density depending on the structures of the positive electrode layer, the electrolyte layer, and the negative electrode layer.

A fluoride shuttle secondary battery that can be operated at, for example, 200° C. or less, or 150° C. or less, can be constructed by using the fluoride ion conductive material of the present disclosure as the electrolyte and/or the negative electrode active material of the fluoride shuttle secondary battery.

The fluoride ion conductive material of the present disclosure may be produced by any method. For example, the fluoride ion conductive material can be produced by mixing lanthanum fluoride and strontium fluoride at a ratio giving a desired molar ratio between La and Sr after mixing. The ion conductive material has a more homogeneous composition by performing the mixing with a pulverizer, such as a ball mill or a rod mill, or a particle mixer. The lanthanum fluoride is, for example, $LaF_3$. The strontium fluoride is, for example, $SrF_2$. The ion conductive material after mixing can be processed into a predetermined shape by molding. In the molding, for example, press and sintering can be carried out.

Fluoride Shuttle Secondary Battery

Embodiment 1

FIG. 1 is a cross-sectional view schematically illustrating the structure of a fluoride shuttle secondary battery of Embodiment 1. The fluoride shuttle secondary battery 1 shown in FIG. 1 includes a positive electrode layer 2, a negative electrode layer 4, and an electrolyte layer 3. The electrolyte layer 3 is located between the positive electrode layer 2 and the negative electrode layer 4. The positive electrode layer 2, the electrolyte layer 3, and the negative electrode layer 4 are in contact with each other.

The positive electrode layer 2, the electrolyte layer 3, and the negative electrode layer 4 are all solid. The battery 1 is an all-solid secondary battery.

The positive electrode layer 2 includes, for example, a positive electrode active material and a solid electrolyte having a fluoride ion conductivity. The electrolyte layer 3 includes a solid electrolyte having a fluoride ion conductivity. The negative electrode layer 4 includes, for example, a negative electrode active material and a solid electrolyte having a fluoride ion conductivity. In the battery 1, the electrolyte included in at least one layer selected from the group consisting of the positive electrode layer 2, the electrolyte layer 3, and the negative electrode layer 4 is the fluoride ion conductive material of the present disclosure.

The battery 1 can include the fluoride ion conductive material of the present disclosure as the electrolyte included in the electrolyte layer 3 and/or the negative electrode layer 4.

The battery 1 can include the fluoride ion conductive material of the present disclosure as the electrolyte included in the electrolyte layer 3. In such a case, the electrolyte layer 3 can be made of the fluoride ion conductive material of the present disclosure.

The battery 1 can include the fluoride ion conductive material of the present disclosure as the negative electrode active material included in the negative electrode layer 4 depending on the combination with the positive electrode active material included in the positive electrode layer 2.

The battery 1 can be operated at a relatively low temperature of, for example, 200° C. or less, or 150° C. or less, by using the fluoride ion conductive material of the present disclosure. The battery 1 having high power characteristics can be constructed by using the fluoride ion conductive material of the present disclosure, in particular, in the electrolyte layer 3.

The electrolyte layer 3 is a layer having a fluoride ion conductivity in the thickness direction, i.e., in the stacking direction of the positive electrode layer 2 and the negative electrode layer 4. The electrolyte layer 3, typically, does not have electron conductivity in the thickness direction. The electrolyte layer 3 has a thickness of, for example, 1 to 1000 μm. The electrolyte layer 3 can have a thickness of 200 to 800 μm, or 300 to 700 μm. When the electrolyte layer 3 has a thickness within such a range, electric short-circuit between the positive electrode layer 2 and the negative electrode layer 4 is prevented, and the fluoride ion conductivity can be more certainly ensured. Thus, the conductivity of fluoride ions can be more certainly ensured, and thereby a battery 1 having higher output characteristics can be constructed.

The specific structure of the electrolyte layer 3 is not limited. The electrolyte layer 3 is, for example, a thin film including a fluoride ion conductive material. The electrolyte layer 3 can be an aggregate of fluoride ion conductive material particles. These fluoride ion conductive materials can be the fluoride ion conductive material of the present disclosure.

As long as the battery 1 functions as a fluoride shuttle secondary battery, the electrolyte layer 3 can include a material other than the fluoride ion conductive material.

The positive electrode layer 2 is a layer including a positive electrode active material. The positive electrode layer 2 may be a positive electrode mixture layer including a positive electrode active material and an electrolyte having a fluoride ion conductivity.

The positive electrode active material is a material that can occlude and release fluoride ions as the battery is charged and discharged. The occlusion and release include both a form involving a chemical reaction with fluoride ions and a form not accompanied by a chemical reaction, such as intercalation. Examples of the chemical reaction include a reaction forming a compound and a reaction forming a complex not being a compound, such as an alloy or a solid solution.

The positive electrode active material can be a material showing a potential as the standard electrode potential higher than that of the negative electrode active material of the negative electrode layer 4 combined in the battery 1.

The positive electrode active material includes, for example, at least one element selected from the group consisting of Co, Cu, Bi, Sn, Pb, Fe, Zn, Ga, and C. The positive electrode active material can be a simple substance, a complex such as an alloy or a solid solution, or a compound of the at least one element. The compound is, for example, a fluoride. C (carbon) in the positive electrode active material is, for example, graphite or non-graphite carbon, such as hard carbon and coke. When such carbon is used as the positive electrode active material, the manufacturing cost of the battery 1 can be reduced, and the average discharge voltage can be increased.

The positive electrode layer 2 has a thickness of, for example, 1 to 500 μm. The positive electrode layer 2 can have a thickness of 1 to 400 μm, or 50 to 200 μm. When the positive electrode layer 2 has a thickness within such a range, the battery 1 can have a further increased energy density and can be more stably operated at high power.

The specific structure of the positive electrode layer 2 is not limited. The positive electrode layer 2 is, for example, a thin film including a positive electrode active material and a fluoride ion conductive material. The positive electrode layer 2 can include particles of the positive electrode active material and particles of the fluoride ion conductive material. The fluoride ion conductive material can be the fluoride ion conductive material of the present disclosure.

As long as the battery 1 functions as a fluoride shuttle secondary battery, the positive electrode layer 2 can include a material other than the above-mentioned materials.

The negative electrode layer 4 is a layer including a negative electrode active material. The negative electrode layer 4 may be a negative electrode mixture layer including a negative electrode active material and an electrolyte having a fluoride ion conductivity.

The negative electrode active material is a material that can occlude and release fluoride ions as the battery is charged and discharged. The occlusion and release include a form involving a chemical reaction with fluoride ions and a form not accompanied by a chemical reaction, such as intercalation. Examples of the chemical reaction include a reaction forming a compound and a reaction forming a complex, not a compound, such as an alloy or a solid solution.

The negative electrode active material can be a material showing a potential as the standard electrode potential lower than that of the positive electrode active material of the positive electrode layer 2 combined in the battery 1.

The negative electrode active material includes, for example, at least one element selected from the group consisting of Ti, Zr, Al, Sc, Rb, Ge, Cs, Mg, K, Na, La, Ca, Ba, and Sr. The negative electrode active material can be a simple substance, a complex such as an alloy or a solid solution, or a compound of the at least one element. The compound is, for example a fluoride.

The negative electrode layer 4 has a thickness of, for example, 1 to 500 μm. The thickness of the negative electrode layer 4 can be 1 to 400 μm, or 50 to 200 μm. When the negative electrode layer 4 has a thickness within such a range, the battery 1 can have a further increased energy density and can be more stably operated at high power.

The specific structure of the negative electrode layer 4 is not limited. The negative electrode layer 4 is, for example, a thin film including a negative electrode active material and a fluoride ion conductive material. The negative electrode layer 4 can include particles of the negative electrode active material and particles of the fluoride ion conductive material. The fluoride ion conductive material can be the fluoride ion conductive material of the present disclosure.

As long as the battery 1 functions as a fluoride shuttle secondary battery, the negative electrode layer 4 can include a material other than the above-mentioned materials.

The positive electrode layer 2 and the negative electrode layer 4 can each include a conductive auxiliary agent. When a layer includes a conductive auxiliary agent, the electrode resistance of the layer can be reduced.

The conductive auxiliary agent may be any auxiliary agent having an electron conductivity. Examples of the conductive auxiliary agent include graphite, such as natural graphite and artificial graphite; carbon black, such as acetylene black and ketjen black; conductive fibers, such as carbon fibers and metal fibers; carbon fluoride; metal powders, such as aluminum; conductive whiskers, such as zinc oxide and potassium titanate; conductive metal oxides, such as titanium oxide; and conductive polymer compounds, such as polyaniline, polypyrrole, and polythiophene. Use of a carbon-based conductive auxiliary agent, such as graphite and carbon black, can reduce the cost of the battery 1.

The ratio of the electrode active material, the electrolyte, and the conductive auxiliary agent contained in each of the positive electrode layer 2 and the negative electrode layer 4 is not limited.

The positive electrode layer 2 and the negative electrode layer 4 can include at least one material selected from the group consisting of an electrode active material, an electrolyte, and a conductive auxiliary agent in a particle form.

The layer including a particulate material can further include a binder for binding the particles to each other. The binder can improve the binding properties between the particles in the layer. In addition, the binder can improve the bondability (i.e., adhesion strength) to an adjacent layer. For example, the binder can improve the bondability of the positive electrode layer 2 or the negative electrode layer 4 to a current collector 5 or 6 adjacent to the positive or negative electrode layer 2 or 4. The improvement in the bondability contributes to a reduction in the thickness of each layer. For example, in the positive electrode layer 2 and the negative electrode layer 4, the electrode active material molecules can be more reliably brought into contact with each other. Also in the electrolyte layer 3, the electrolyte molecules can be more reliably brought into contact with each other. The reduction in the thickness of each layer can further increase the energy density of the battery 1.

The binder is not limited. Examples of the binder include binders composed of fluorine-based resins, such as polyvinylidene fluoride (PVdF), polytetrafluoroethylene (PTFE), a tetrafluoroethylene-hexafluoropropylene copolymer (FEP), a tetrafluoroethylene-hexafluoroethylene copolymer, a Teflon binder, poly(vinylidene fluoride), a tetrafluoroethylene-perfluoroalkyl vinyl ether copolymer (PFA), a vinylidene fluoride-hexafluoropropylene copolymer, a vinylidene fluoride-chlorotrifluoroethylene copolymer, an ethylene-tetrafluoroethylene copolymer (ETFE), polychlorotrifluoroethylene (PCTFE), a vinylidene fluoride-hexafluoropropylene-tetrafluoroethylene copolymer, a vinylidene fluoride-perfluoromethyl vinyl ether-tetrafluoroethylene copolymer, and an ethylene-chlorotrifluoroethylene copolymer (ECTFE); polymer compounds, such as carboxymethyl cellulose, polyacrylonitrile, polyethylene oxide, polypropylene oxide, polyvinyl chloride, polymethyl methacrylate, polymethyl acrylate, polymethacrylic acid and metal salts thereof, polyacrylic acid and metal salts thereof, polyvinyl alcohol, polyvinylidene chloride, polyethylene imine, polymethacrylonitrile, polyvinyl acetate, polyimide, polyamic acid, polyamide imide, polyethylene, polypropylene, an ethylene-propylene-diethane polymer, polyvinyl acetate, nitrocellulose, an ethylene-acrylic acid copolymer and an $Na^+$ ion crosslinked structure thereof, an ethylene-methacrylic acid copolymer and an $Na^+$ ion crosslinked structure thereof, an ethylene-methyl acrylate copolymer and an $Na^+$ ion crosslinked structure thereof, an ethylene-methyl methacrylate copolymer and an $Na^+$ ion crosslinked structure thereof, a polyester resin, a monoalkyltrialkoxysilane polymer, and a polymer prepared by copolymerization of a monoalkyltrialkoxysilane polymer and a tetraalkoxysilane monomer; and rubbery polymers, such as styrene butadiene rubber (SBR), butadiene rubber (BR), a styrene-isoprene copolymer, an isobutylene-isoprene copolymer (butyl rubber), acrylonitrile-butadiene rubber, an ethylene-propylene-diene copolymer, an acrylonitrile-butadiene copolymer (NBR), hydrogenated SBR, hydrogenated NBR, ethylene-propylene-dienemer (EPDM), and sulfonated EPDM.

When the binder is an insulation material that does not conduct fluoride ions and/or electrons, an excessive increase in the content of the binder in each layer may deteriorate the charge and discharge characteristics of the battery or may rather decrease the energy density. From this viewpoint, the content of the insulation material as the binder in the layer is, for example, 20 wt % or less and can be 5 wt % or less.

In the battery 1, all the positive electrode layer 2, the electrolyte layer 3, and the negative electrode layer 4 may include a binder. At least one layer selected from the group consisting of the positive electrode layer 2, the electrolyte layer 3, and the negative electrode layer 4 can have a structure not including a binder.

The battery 1 exemplified in FIG. 1 further includes a positive electrode current collector 5 and a negative electrode current collector 6. The positive electrode current collector 5 is in contact with the positive electrode layer 2. The negative electrode current collector 6 is in contact with the negative electrode layer 4. The layered product of the positive electrode layer 2, the electrolyte layer 3, and the negative electrode layer 4 is located between the positive electrode current collector 5 and the negative electrode current collector 6.

The positive electrode current collector 5 and the negative electrode current collector 6 each have an electron conductivity. The positive electrode current collector 5 and the negative electrode current collector 6 each have an electron conductivity and can be made of a material resistant to corrosion in a charge and discharge environment of the battery 1.

The positive electrode current collector 5 is made of, for example, a metal material, such as aluminum, gold, platinum, or an alloy thereof. The positive electrode current collector 5 may have any shape, such as a sheet or film shape. The positive electrode current collector 5 can be a porous or nonporous sheet or film. Examples of the sheet and film include foil and mesh. Aluminum and alloys thereof are inexpensive and can be easily formed into a thin film. The positive electrode current collector 5 can be made of carbon-coated aluminum. The positive electrode current collector 5 has a thickness of, for example, 1 to 30 µm. When the thickness of the positive electrode current collector 5 is within this range, the strength of the current collector can be more certainly ensured. For example, the current collector is prevented from being cracked or broken, and the energy density of the battery 1 can be more certainly ensured.

The positive electrode current collector 5 can have a positive electrode terminal.

The negative electrode current collector 6 is made of, for example, a metal material, such as gold, platinum, aluminum, or an alloy thereof. The negative electrode current collector 6 may have any shape, such as a sheet or film shape. The negative electrode current collector 6 can be a porous or nonporous sheet or film. Examples of the sheet and film include foil and mesh. Aluminum and alloys thereof are inexpensive and can be easily formed into a thin film. The negative electrode current collector 6 can be made of carbon-coated aluminum. The negative electrode current collector 6 has a thickness of, for example, 1 to 30 µm. When the thickness of the negative electrode current collector 6 is within this range, the strength of the current collector can be more certainly ensured. For example, the current collector is prevented from being cracked or broken, and the energy density of the battery 1 can be more certainly ensured.

The negative electrode current collector 6 can have a negative electrode terminal.

The fluoride shuttle secondary battery of the present disclosure can include any member and have any structure other than those described above as long as the battery can be charged and discharged and can be used as a secondary battery.

The fluoride shuttle secondary battery of the present disclosure may have any shape. The shape can be a shape of a known secondary battery. Examples of the shape are rectangular, circular, elliptical, and hexagonal shapes. The fluoride shuttle secondary battery of the present disclosure may have a structure in which the battery (single battery) exemplified in the embodiment is further stacked or a structure in which the battery is folded. In such a case, the fluoride shuttle secondary battery of the present disclosure can have various battery shapes, such as a cylindrical, square, button, coin, or flat shape.

The fluoride shuttle secondary battery of the present disclosure may be produced by any method. The fluoride shuttle secondary battery of the present disclosure can be produced by a method of producing a known secondary battery, typically, an all-solid secondary battery, except that the fluoride ion conductive material of the present disclosure is used as the electrolyte.

Each layer constituting the fluoride shuttle secondary battery of the present disclosure can be formed by a known thin film-forming method. The thin film-forming method is, for example, chemical deposition or physical deposition. Examples of the physical deposition include sputtering, vacuum deposition, ion plating, and pulsed laser deposition (PLD) in which deposition is performed by irradiating a target with a pulsed laser. Examples of the chemical deposition include chemical vapor deposition (CVD) methods, such as plasma CVD, thermal CVD, and laser CVD; liquid phase film-forming methods represented by a wet plating method, such as electrolytic plating, immersion plating, or electroless plating; a sol-gel method; a metal-organic decomposition (MOD) method; a spray pyrolysis method; a doctor blade method using a fine particle dispersion; spin coating; and printing technologies, such as ink jetting and screen printing. The thin film-forming method is not limited to these examples.

EXAMPLE

The fluoride ion conductive material of the present disclosure will now be described in more detail based on Example. The fluoride ion conductive material of the present disclosure is not limited to the materials shown in the following Example.

Method of Evaluating Fluoride Ion Conductance

The fluoride ion conductance of fluoride ion conductive materials produced in the Example was evaluated as follows.

Figure 2:
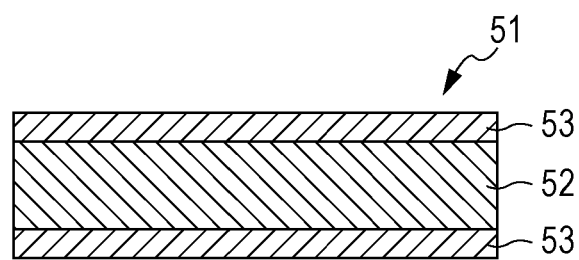
FIG. 2 is a cross-sectional view schematically illustrating a cell for evaluating the ion conductance of a fluoride ion conductive material produced in Example.

From a produced particulate ion conductive material, 0.20 g of the material was weighed. The weighed material was placed in a metal tube having a diameter of 10 mm and was pre-pressed at a pressure of 10 MPa for 1 minute at 25° C. to form an electrolyte layer 52 (see FIG. 2) in a disk shape (diameter: 10 mm). Subsequently, a gold foil 53 having a diameter of 10 mm and a thickness of 20 μm was located on each of the main surfaces of the resulting electrolyte layer 52. Subsequently, the electrolyte layer 52 after the disposition of the gold foils 53 was pressed at 40 MPa for 1 minute at 25° C. to produce a cell 51 for evaluation of ion conductance. Subsequently, an impedance analyzer was connected to both the gold foils 53 of the resulting cell 51, and the ion conductance of the cell 51 was measured while maintaining the cell 51 at 140° C. The ion conductance was measured by a complex impedance method.

Sample 1

$LaF_3$ particles (available from Kojundo Chemical Laboratory Co., Ltd.) were milled with a planetary ball mill for 6 hours. Subsequently, the crystallization temperature of the particles after the milling treatment was measured with a differential scanning calorimeter (DSC). Subsequently, the particles after the milling treatment were heated in an inert gas atmosphere at a temperature 20° C. higher than the measured crystallization temperature for 1 hour. Thus, a material having a composition represented by a formula $LaF_3$ was produced.

The fluoride ion conductance of the produced material is shown in Table 1. The description in parentheses in the column "Composition ratio and Composition" of Table 1 is the composition.

Sample 2

$LaF_3$ and $SrF_2$ particles (both particles are available from Kojundo Chemical Laboratory Co., Ltd.) were mixed at a molar ratio of $LaF_3:SrF_2=95:5$. Subsequently, the mixture was milled with a planetary ball mill for 6 hours. Subsequently, the crystallization temperature of the mixture after the milling was measured with a DSC. Subsequently, the mixture after the milling treatment was heated in an inert gas atmosphere at a temperature 20° C. higher than the measured crystallization temperature for 1 hour. Thus, a fluoride ion conductive material having a composition represented by a formula $La_{0.95}Sr_{0.05}F_{2.95}$ was prepared.

The fluoride ion conductance of the produced material is shown in Table 1.

Sample 3

A fluoride ion conductive material having a composition represented by a formula $La_{0.9}Sr_{0.1}F_{2.9}$ was prepared as in Sample 2 except that the mixing ratio between $LaF_3$ and $SrF_2$ particles was $LaF_3:SrF_2=90:10$ by the molar ratio. The fluoride ion conductance of the produced material is shown in Table 1.

Sample 4

A fluoride ion conductive material having a composition represented by a formula $La_{0.85}Sr_{0.15}F_{2.85}$ was prepared as in Sample 2 except that the mixing ratio between $LaF_3$ and $SrF_2$ particles was $LaF_3:SrF_2=85:15$ by the molar ratio. The fluoride ion conductance of the produced material is shown in Table 1.

Sample 5

A fluoride ion conductive material having a composition represented by a formula $La_{0.8}Sr_{0.2}F_{2.8}$ was prepared as in Sample 2 except that the mixing ratio between $LaF_3$ and $SrF_2$ particles was $LaF_3:SrF_2=80:20$ by the molar ratio. The fluoride ion conductance of the produced material is shown in Table 1.

Sample 6

A fluoride ion conductive material having a composition represented by a formula $La_{0.7}Sr_{0.3}F_{2.7}$ was prepared as in Sample 2 except that the mixing ratio between $LaF_3$ and $SrF_2$ particles was $LaF_3:SrF_2=70:30$ by the molar ratio. The fluoride ion conductance of the produced material is shown in Table 1.

Sample 7

A fluoride ion conductive material having a composition represented by a formula $La_{0.6}Sr_{0.4}F_{2.6}$ was prepared as in Sample 2 except that the mixing ratio between $LaF_3$ and $SrF_2$ particles was $LaF_3:SrF_2=60:40$ by the molar ratio. The fluoride ion conductance of the produced material is shown in Table 1.

Sample 8

A fluoride ion conductive material having a composition represented by a formula $La_{0.5}Sr_{0.5}F_{2.5}$ was prepared as in Sample 2 except that the mixing ratio between $LaF_3$ and $SrF_2$ particles was $LaF_3:SrF_2=50:50$ by the molar ratio. The fluoride ion conductance of the produced material is shown in Table 1.

Sample 9

A fluoride ion conductive material having a composition represented by a formula $La_{0.4}Sr_{0.6}F_{2.4}$ was prepared as in Sample 2 except that the mixing ratio between $LaF_3$ and $SrF_2$ particles was $LaF_3:SrF_2=40:60$ by the molar ratio. The fluoride ion conductance of the produced material is shown in Table 1.

Sample 10

A fluoride ion conductive material having a composition represented by a formula $La_{0.3}Sr_{0.7}F_{2.3}$ was prepared as in Sample 2 except that the mixing ratio between $LaF_3$ and $SrF_2$ particles was $LaF_3:SrF_2=30:70$ by the molar ratio. The fluoride ion conductance of the produced material is shown in Table 1.

Sample 11

A fluoride ion conductive material having a composition represented by a formula $La_{0.2}Sr_{0.8}F_{2.2}$ was prepared as in Sample 2 except that the mixing ratio between $LaF_3$ and $SrF_2$ particles was $LaF_3:SrF_2=20:80$ by the molar ratio. The fluoride ion conductance of the produced material is shown in Table 1.

Sample 12

A fluoride ion conductive material having a composition represented by a formula $La_{0.1}Sr_{0.9}F_{2.1}$ was prepared as in Sample 2 except that the mixing ratio between $LaF_3$ and $SrF_2$ particles was $LaF_3:SrF_2=10:90$ by the molar ratio. The fluoride ion conductance of the produced material is shown in Table 1.

Sample 13

A material having a composition represented by a formula $SrF_2$ was prepared as in Sample 1 except that $SrF_2$ particles were used instead of $LaF_3$ particles. The fluoride ion conductance of the produced material is shown in Table 1.

TABLE 1

|  | Composition ratio and Composition | Conductance [S/cm] at 140° C. |
|---|---|---|
| Sample 1 | $LaF_3:SrF_2 = 100:0$ ($LaF_3$; $x = 0$) | $1.9 \times 10^{-8}$ |
| Sample 2 | $LaF_3:SrF_2 = 95:5$ ($La_{0.95}Sr_{0.05}F_{2.95}$; $x = 0.05$) | $1.9 \times 10^{-4}$ |
| Sample 3 | $LaF_3:SrF_2 = 90:10$ ($La_{0.9}Sr_{0.1}F_{2.9}$; $x = 0.1$) | $1.1 \times 10^{-3}$ |
| Sample 4 | $LaF_3:SrF_2 = 85:15$ ($La_{0.85}Sr_{0.15}F_{2.85}$; $x = 0.15$) | $3.9 \times 10^{-3}$ |
| Sample 5 | $LaF_3:SrF_2 = 80:20$ ($La_{0.8}Sr_{0.2}F_{2.8}$; $x = 0.2$) | $1.3 \times 10^{-3}$ |
| Sample 6 | $LaF_3:SrF_2 = 70:30$ ($La_{0.7}Sr_{0.3}F_{2.7}$; $x = 0.3$) | $2.1 \times 10^{-4}$ |
| Sample 7 | $LaF_3:SrF_2 = 60:40$ ($La_{0.6}Sr_{0.4}F_{2.6}$; $x = 0.4$) | $4.4 \times 10^{-4}$ |
| Sample 8 | $LaF_3:SrF_2 = 50:50$ ($La_{0.5}Sr_{0.5}F_{2.5}$; $x = 0.5$) | $7.0 \times 10^{-6}$ |
| Sample 9 | $LaF_3:SrF_2 = 40:60$ ($La_{0.4}Sr_{0.6}F_{2.4}$; $x = 0.6$) | $7.9 \times 10^{-6}$ |
| Sample 10 | $LaF_3:SrF_2 = 30:70$ ($La_{0.3}Sr_{0.7}F_{2.3}$; $x = 0.7$) | $5.1 \times 10^{-6}$ |
| Sample 11 | $LaF_3:SrF_2 = 20:80$ ($La_{0.2}Sr_{0.8}F_{2.2}$; $x = 0.8$) | $1.8 \times 10^{-6}$ |
| Sample 12 | $LaF_3:SrF_2 = 10:90$ ($La_{0.1}Sr_{0.9}F_{2.1}$; $x = 0.9$) | $2.1 \times 10^{-7}$ |
| Sample 13 | $LaF_3:SrF_2 = 0:100$ ($SrF_2$; $x = 1$) | $3.8 \times 10^{-10}$ |

As shown in Table 1, in Samples 2 to 12 including lanthanum fluoride and strontium fluoride, the fluoride ion conductance was improved compared to Sample 1 composed of lanthanum fluoride and Sample 13 composed of strontium fluoride. Furthermore, particularly, in Samples 2 to 7 having a composition represented by a formula $La_{1-x}Sr_xF_{3-x}$ ($0.05 \leq x \times \leq 0.4$), the fluoride ion conductance was highly improved.

The fluoride ion conductive material and the fluoride shuttle secondary battery of the present disclosure are not limited to each embodiment described above and can be variously modified or changed within the scope of the invention defined by the claims. For example, the technical features shown in the embodiments described in DETAILED DESCRIPTION can be appropriately replaced or combined for solving a part or all of the above-described problems or for achieving a part or all of the above-described effects. Furthermore, unless the technical features are explained in the present specification as essential technical features, the technical features can be deleted as appropriate.

The application of the fluoride ion conductive material of the present disclosure is not limited. The fluoride ion conductive material of the present disclosure can be used, for example, as the electrolyte of a fluoride shuttle secondary battery. The fluoride shuttle secondary battery of the present disclosure is expected to be applied to a variety of applications as a rechargeable secondary battery.

What is claimed is:

1. A fluoride shuttle secondary battery comprising:
   a positive electrode layer;
   a negative electrode layer; and
   an electrolyte layer located between the positive electrode layer and the negative electrode layer; wherein
   at least one layer selected from the group consisting of the positive electrode layer, the negative electrode layer, and the electrolyte layer includes a fluoride ion conductive material containing lanthanum fluoride and strontium fluoride, and
   wherein the fluoride ion conductive material has a composition represented by a formula $La_{1-x}Sr_xF_{3-x}$, where x satisfies $0.05 \leq x \leq 0.4$.

2. The fluoride shuttle secondary battery according to claim 1, wherein
   the electrolyte layer and/or the negative electrode layer includes the fluoride ion conductive material.

3. The fluoride shuttle secondary battery according to claim 1, wherein
   the electrolyte layer includes the fluoride ion conductive material.

4. The fluoride shuttle secondary battery according to claim 1, wherein
   the positive electrode layer includes a positive electrode active material; and
   the positive electrode active material includes at least one element selected from the group consisting of Co, Cu, Bi, Sn, Pb, Fe, Zn, Ga, and C.

5. The fluoride shuttle secondary battery according to claim 1, wherein
   the negative electrode layer includes a negative electrode active material; and
   the negative electrode active material includes at least one element selected from the group consisting of Ti, Zr, Al, Sc, Rb, Ge, Cs, Mg, K, Na, La, Ca, Ba, and Sr.

6. The fluoride shuttle secondary battery according to claim 4, wherein
   the negative electrode layer includes a negative electrode active material; and the negative electrode active material includes at least one element selected from the group consisting of Ti, Zr, Al, Sc, Rb, Ge, Cs, Mg, K, Na, La, Ca, Ba, and Sr.

* * * * *